United States Patent [19]
Kaul

[11] 3,867,035
[45] Feb. 18, 1975

[54] PHOTOELECTRIC STEP MARKER
[75] Inventor: Dietmar Kaul, Wetzlar, Germany
[73] Assignee: Ernst Leitz GmbH, Wetzlar, Germany
[22] Filed: Dec. 17, 1973
[21] Appl. No.: 425,077

[30] Foreign Application Priority Data
Dec. 19, 1972 Germany............................ 2262065

[52] U.S. Cl................. 356/110, 356/169, 356/172
[51] Int. Cl. ............................................. G01b 9/02
[58] Field of Search .......... 356/169, 172, 110, 114; 250/237; 350/162, 163

[56] References Cited
UNITED STATES PATENTS
3,482,107 12/1969 Hock .............................. 356/169 X
3,756,723 9/1973 Hock .............................. 356/169 X Primary Examiner—Ronald L. Wibert
Assistant Examiner—Paul K. Godwin
Attorney, Agent, or Firm—Gilbert L. Wells; Krafft & Wells

[57] ABSTRACT

A photoelectric step marker for the measurement of the amplitude and sign of object displacements in two coordinates. The step marker comprises a measuring grating divided in orthogonal directions and being displaceable with the object. A linear grating is associated with each direction and a spatial frequency filter is used for filtering out for each direction the light resulting from diffraction at the measuring grating. Optical means are provided to produce an optical path difference of $\lambda/4$ between two orthogonal directions of polarisation in the filtered out light; and a polarizing splitter with associated photoelectric receivers is arranged in the ray path of each direction for obtaining electrical signals corresponding to the object displacement.

4 Claims, 1 Drawing Figure

PATENTED FEB 18 1975 3,867,035
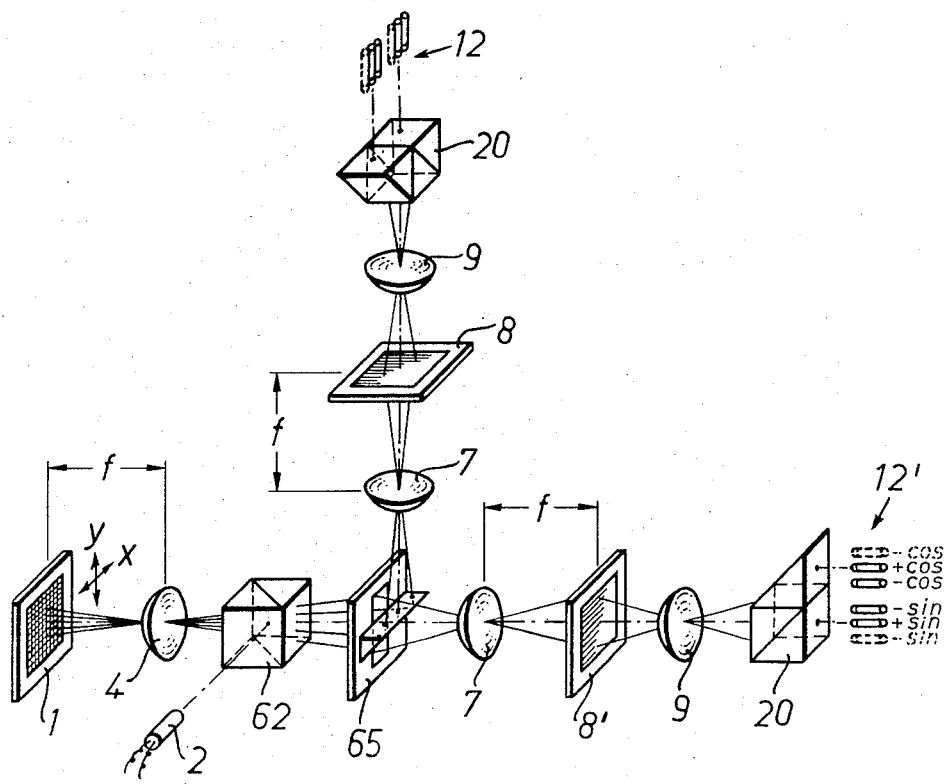

PHOTOELECTRIC STEP MARKER

BACKGROUND OF THE INVENTION

The present invention relates to a photoelectric step marker for the measurement of the amplitude and sign of object displacements in two coordinates.

A photoelectric step marker is already known for the determination of the relative position of an object in two coordinate directions, in which measuring rasters of large area and oriented according to the desired measurement coordinate directions are attached on a rigid object table, which is displaceable as desired on its support plane. Disposed opposite these measuring rasters are reference rasters, mounted to be locally fixed, on which the first mentioned rasters are imaged. Associated with the reference rasters are photoelectric receivers, which convert the light fluxes leaving the reference raster into electric signals. In this step generator, it is disadvantageous, that the spatial dimensions of the table are codetermined by the measuring rasters of large area attached thereon and, referred to these dimensions, only a small measuring range is at disposal. Beyond that, any rotations of the object occurring about the axis of the observation ray path lead to relatively large measuring errors in the case of the known arrangement, since the measuring gratings are disposed in the object plane and invariably have different and variable distances from the axis of the observation ray path.

It is therefore an object of the present invention to provide an improved step marker of this type which overcomes the mentioned disadvantages.

SUMMARY OF THE INVENTION

According to the present invention this object is attained by providing a photoelectric step marker for the measurement of the amplitude and sign of object displacements in two coordinates, comprising a measuring grating, which is divided in two mutually orthogonal directions and which is displaceable with the object, two separate linear gratings each associated with a respective one of the two directions, a spatial frequency filter, which for each of the two directions filters out the light resulting from diffraction at the measuring grating and which is arranged within an optical system disposed between the measuring grating and the linear gratings, the spatial frequency filter comprising light-deflecting optical components for the separation of the ray paths associated with each of the two directions, optical means to produce an optical path difference of $\lambda/4$ between two mutually orthogonal directions of polarisation in the filtered-out light, and an individual polarising splitter with associated photoelectric receivers in the ray path associated with each of the two directions.

BRIEF DESCRIPTION OF THE DRAWINGS

An embodiment of the present invention will now be more particularly described by way of example with reference to the accompanying drawing, the single FIGURE of which is an illustration of a photoelectric step marker embodying the present invention.

DESCRIPTION OF THE PREFERRED EMBODIMENT

A light source 2 illuminates a measuring grating 1, which is divided in two directions of measurement, through a splitter 62 and an optical system 4. This measuring greating is mounted to be displaceable together with the measurement object in two coordinate directions $x$ and $y$. Through optical systems 4 and 7, the measuring grating is imaged onto two separate linear gratings 8 and 8'. The direction of division of the grating 8 is oriented parallel to the $x$ coordinate, the direction of division of the grating 8' parallel to the $y$ coordinate. A parallel ray path prevails between the optical systems 4 and 7 and is split up by a spatial frequency filter 65. In the preferred embodiment, the light deflecting, optical components of the filter 65 are so constructed, that — in addition to ray splitting — they also produce a phase displacement of $\lambda/4$ between ray components, which differ from one another by 90° in their direction of polarisation. Collecting optical systems 9 are accordingly followed by correspondingly oriented polarising ray splitters 20, which conduct the modulated ray path to photoelectric receivers 12 and 12', which are associated with the $x$ and $y$ coordinate respectively and which are arranged in groups. The signal phases are symbolised by the trigonometrical functional symbols of the displacement path. The output signals of the photoelectric receiver groups 12 and 12' represent rotating field signals, from which magnitude and direction of the object grating displacement in the two measuring coordinate directions may be obtained in known manner.

Instead of the illustrated position in the filter plane 6 of the components effecting a $\lambda/4$ displacement, these components may alternatively be disposed as reference gratings 8 and 8' in the ray path between the filter 65 and the respective linear grating.

Although the embodiment is illustrated as an incident light arrangement, it can also without difficulty be modified for use with transmitted light.

If one uses a phase grating as measuring grating 1, then the possibility is provided of obtaining simultaneously with the measuring signals additional antiphase signals, which can then in known manner be used for the elimination of interference components. There are thus then three receivers each (one of which is shown dashed) associated with the $-1$, 0 and $+1$ filtered-out diffraction order.

What is claimed is:

1. A photoelectric step marker for the measurement of the amplitude and sign of object displacements in two coordinates, comprising:
   a. a measuring grating, which is divided in two mutually orthogonal directions and which is displaceable with the object;
   b. two separate linear gratings each associated with a respective one of the two directions;
   c. a spatial frequency filter, which for each of the two directions filters out the light resulting from diffraction at the measuring grating and which is arranged within an optical system disposed between the measuring grating and the linear gratings, the spatial frequency filter comprising light-deflecting optical components for the separation of the ray paths associated with each of the two directions;
   d. optical means to produce an optical path difference of $\lambda/4$ between two mutually orthogonal directions of polarisation in the filtered-out light; and
   e. an individual polarising splitter with associated photoelectric receivers in the ray path associated with each of the two directions.

2. A photoelectric step marker as claimed in claim 1, wherein the measuring grating is constructed as a phase grating and wherein six photoelectric receivers are associated with each polarising splitter.

3. A photoelectric step marker as claimed in claim 1, wherein the optical means to produce the path difference are provided in the range of the spatial frequency filter.

4. A photoelectric step marker as claimed in claim 1, wherein the optical means to produce the path difference are provided in the paths between the spatial frequency filter and the linear gratings.

* * * * *